US006585285B2

United States Patent
Koch

(10) Patent No.: US 6,585,285 B2
(45) Date of Patent: Jul. 1, 2003

(54) MODULAR LOAD TRANSPORTING TRAILER

(75) Inventor: John C. Koch, San Luis Obispo, CA (US)

(73) Assignee: Ken A. Adkison, San Luis Obispo, CA (US)

( * ) Notice: Subject to any disclaimer, the term of this patent is extended or adjusted under 35 U.S.C. 154(b) by 0 days.

(21) Appl. No.: 09/967,162

(22) Filed: Sep. 28, 2001

(65) Prior Publication Data

US 2003/0062707 A1 Apr. 3, 2003

(51) Int. Cl.⁷ .............................................. B62D 63/06
(52) U.S. Cl. .................... 280/656; 280/646; 280/40; 280/789; 224/924; 296/182; 414/474; 414/483
(58) Field of Search ...................... 280/656, 39, 652, 280/655, 646, 645, 40, 38, 639, 491.3, 124.109, 789, 63, 401; 211/17, 22; 224/924; 296/181, 182; 414/482, 469, 474, 483

(56) References Cited

U.S. PATENT DOCUMENTS

| | | | |
|---|---|---|---|
| 639,991 A | 12/1899 | Jewell | |
| 2,468,914 A | 5/1949 | Benaszak et al. ............. 280/40 |
| 2,469,506 A | 5/1949 | Kerr et al. ................ 280/40 X |
| 2,879,072 A | 3/1959 | Rear et al. ..................... 280/40 |
| 3,025,985 A | 3/1962 | Crawford ................ 280/400 X |
| 3,031,180 A | 4/1962 | Sergay ......................... 267/34 |
| 3,367,675 A | 2/1968 | Gearin ....................... 280/639 |
| 3,451,690 A | 6/1969 | Cravens ...................... 280/40 |
| 3,781,030 A | 12/1973 | Ekedal ....................... 280/639 |
| 3,941,406 A | 3/1976 | Eggleston .................... 211/17 |
| 3,966,223 A | 6/1976 | Carr ..................... 280/124.128 |
| 4,230,340 A | 10/1980 | Wasservogel ............... 280/656 |
| 4,239,258 A | 12/1980 | Burris ........................ 280/639 |
| 4,344,643 A | 8/1982 | Ray .................... 280/124.109 |
| 4,442,961 A | 4/1984 | Bott ....................... 211/220 X |
| 4,453,735 A | 6/1984 | Penverne et al. ......... 280/43.18 |
| 4,746,142 A * | 5/1988 | Davis .......................... 280/37 |
| 4,768,806 A * | 9/1988 | Tetreault .............. 280/124.179 |
| 4,786,073 A * | 11/1988 | Harper ..................... 280/491.1 |
| 4,995,129 A * | 2/1991 | Comardo ..................... 14/71.1 |
| 5,249,823 A * | 10/1993 | McCoy et al. .............. 280/144 |
| 5,265,897 A | 11/1993 | Stephens .................... 280/293 |
| 5,340,134 A * | 8/1994 | Dodson ........................ 280/37 |
| 5,364,081 A | 11/1994 | Hartl ....................... 267/64.25 |
| 5,397,148 A | 3/1995 | Nelson .................... 280/416.1 |
| 5,549,231 A | 8/1996 | Fletcher et al. ........... 211/19 X |
| 5,924,836 A * | 7/1999 | Kelly .......................... 280/402 |
| 5,941,542 A | 8/1999 | Kalman .................... 211/17 X |
| 6,164,683 A | 12/2000 | Kalman .................... 211/17 X |
| 6,199,909 B1 * | 3/2001 | Kass et al. .................. 280/656 |

* cited by examiner

Primary Examiner—F. Zeender
(74) Attorney, Agent, or Firm—Marcia J. Rodgers; Shughart, Thomson & Kilroy, P.C.

(57) ABSTRACT

A load transporting trailer has modular construction with components that are readily separable for quick disassembly into light weight, packable, conventional luggage-sized elements. The trailer includes a pair of lateral frame sections, each including a folding wheel assembly adapted for folding relative to its associated frame section. A central frame section intercouples the lateral frame sections in side-by-side relationship. Alternatively, a pair of rectangular frame sections may be intercoupled with a hinge. A removable deck panel is installed in each frame section and a bike stand may be attached. The trailer includes a tow bar coupled with the frame for connecting the trailer to a towing vehicle. The tow bar folds to form a tripod for supporting the trailer in an upright, parked position. A pair of castered legs is coupled with the aft portion of each frame section to permit rolling of the parked trailer.

12 Claims, 7 Drawing Sheets

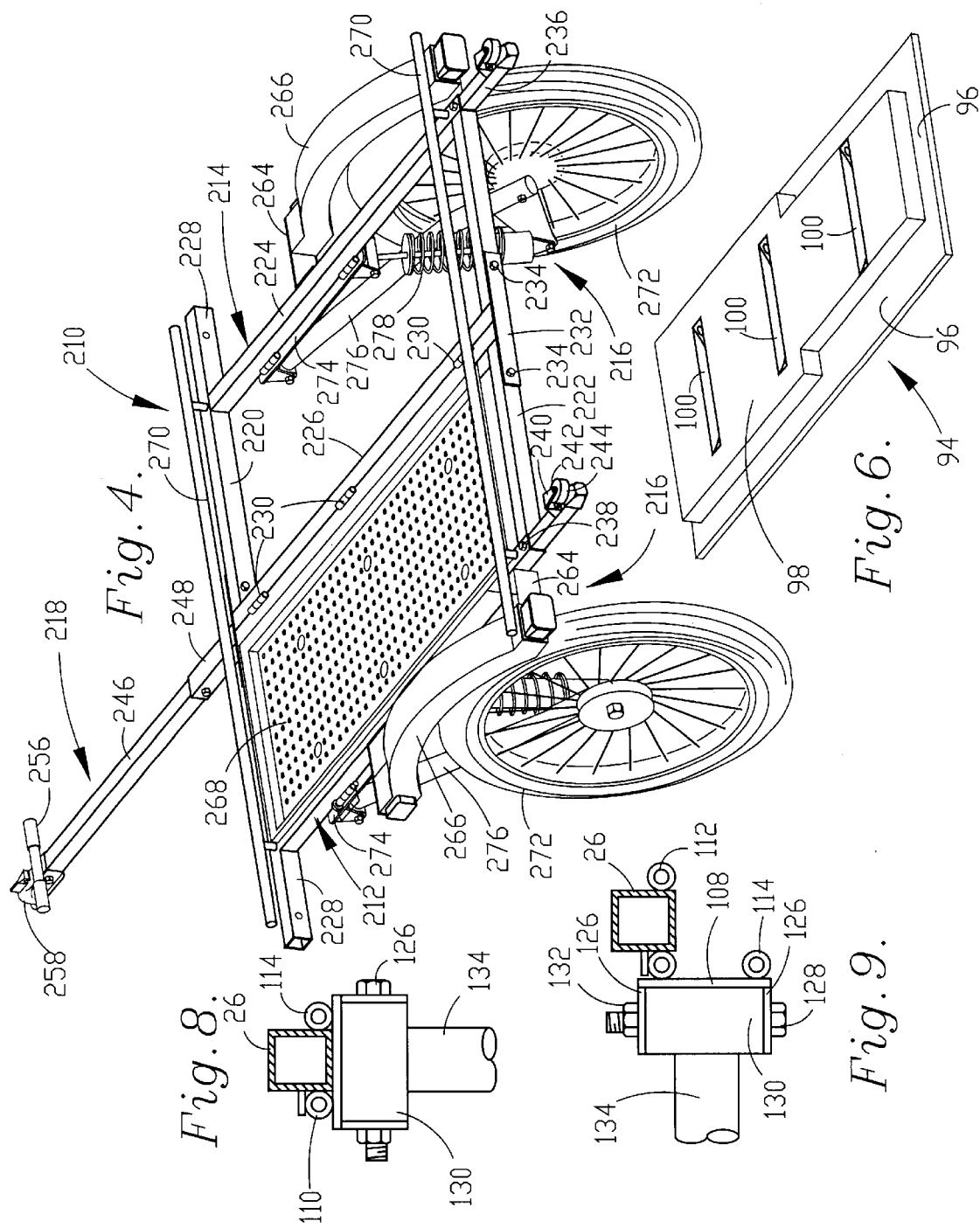

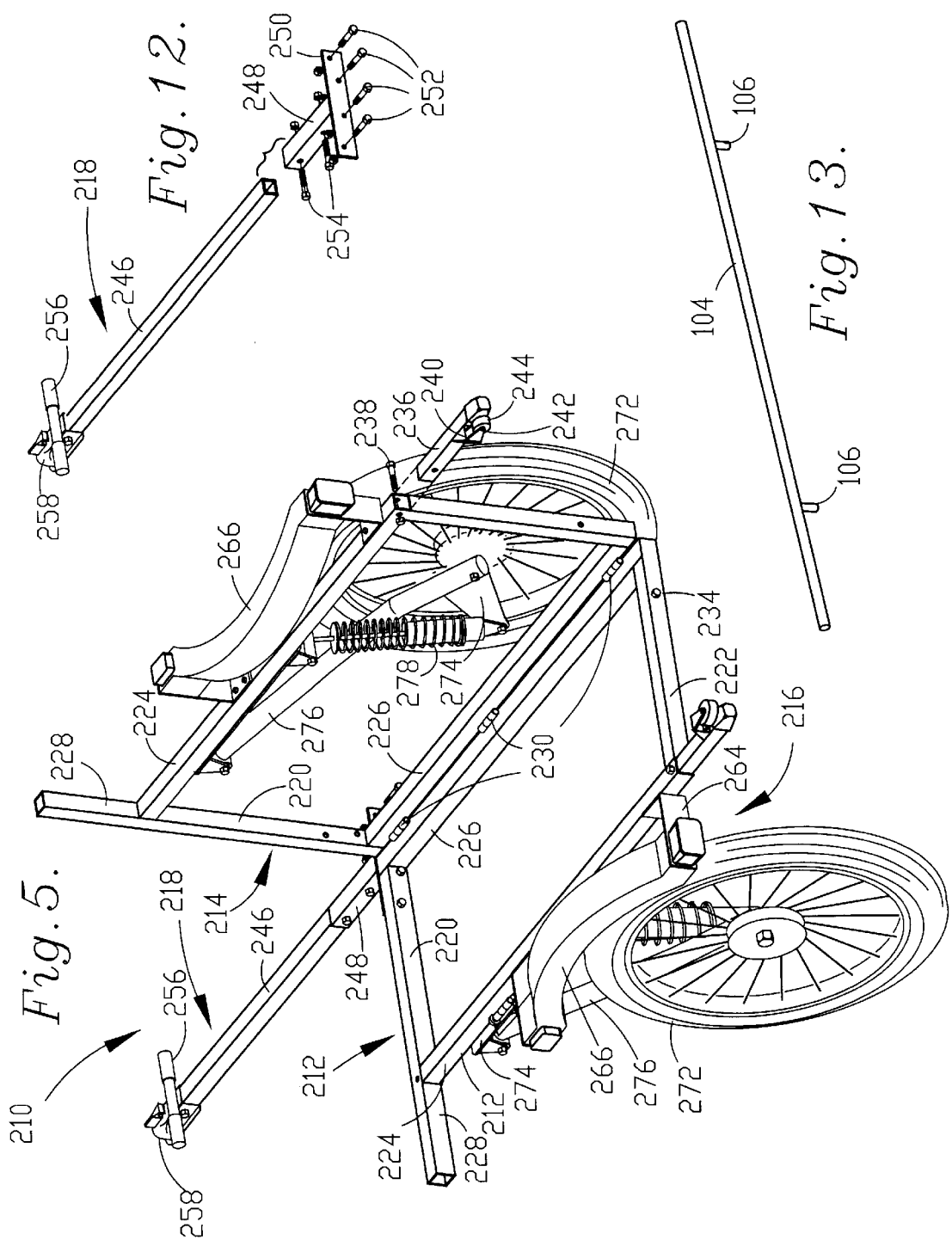

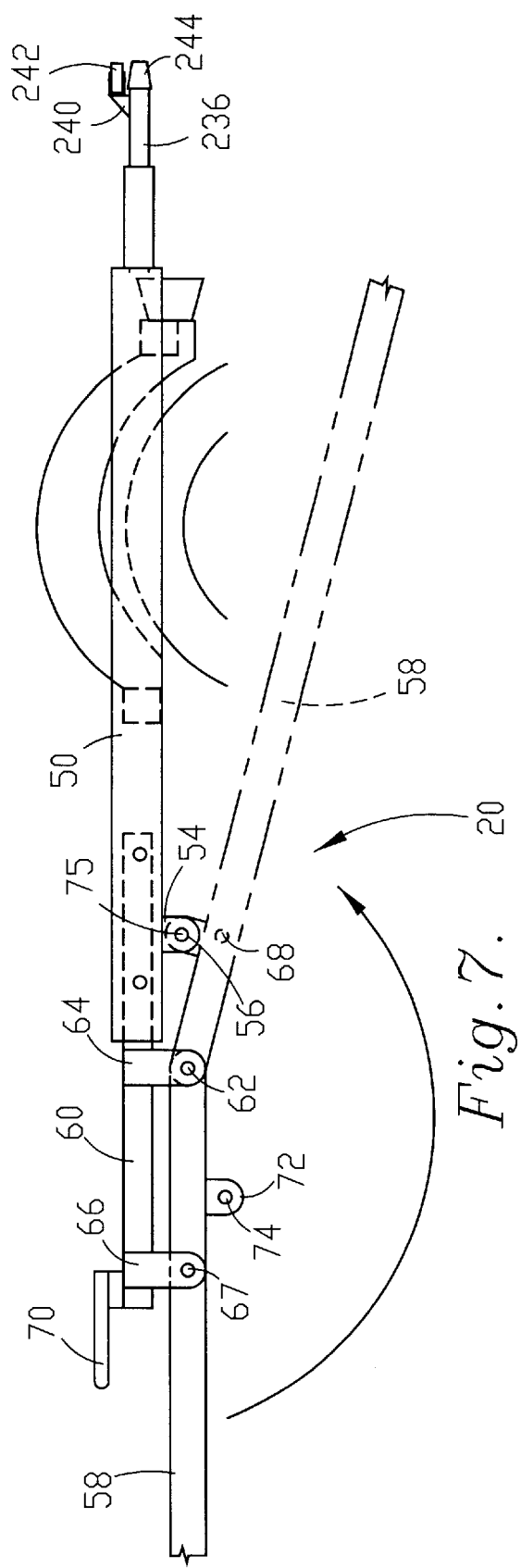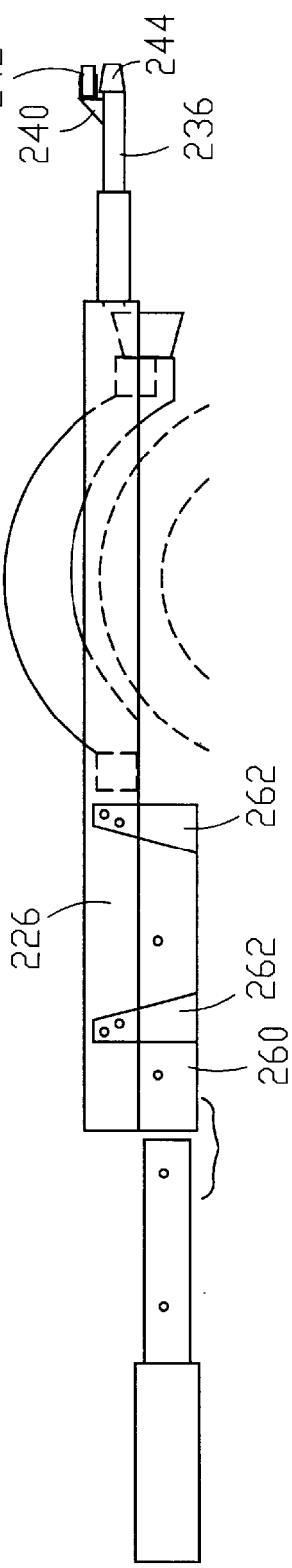

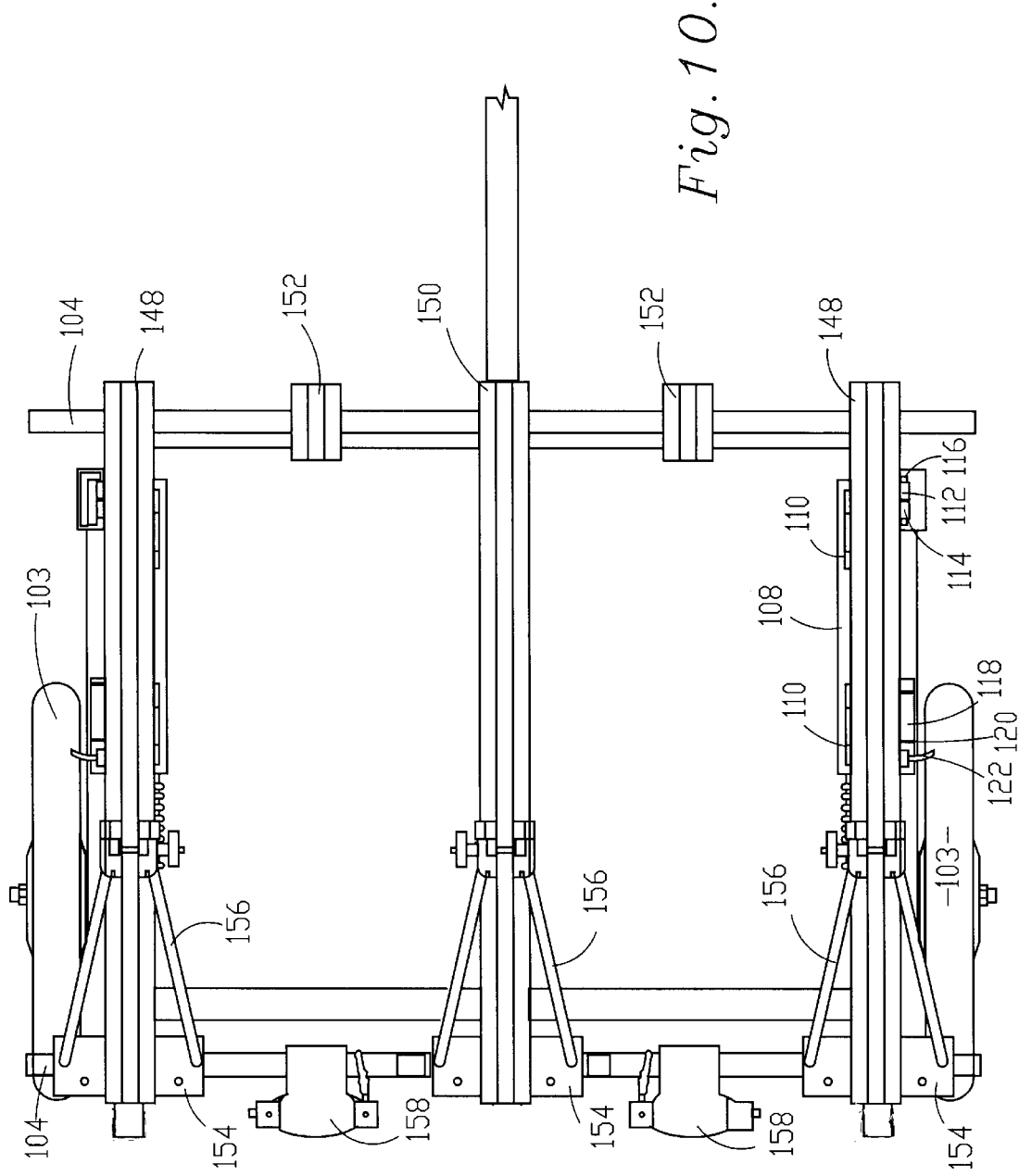

MODULAR LOAD TRANSPORTING TRAILER

BACKGROUND OF INVENTION

1. Field of the Invention

The present invention relates generally to a load transporting trailer for use in towing behind a vehicle such as a car, truck or the like, and more particularly to an improved modular trailer that may be quickly disassembled for hand carrying or shipping.

2. Description of the Related Art

Conventional passenger vehicles, generally lack sufficient space for transporting quantities of cargo or bulky items. Certain vehicles, such as compact cars and neighborhood electric vehicles (NEVs) were purposely designed with minimal cargo space in order to reduce their overall size and weight. Even larger vehicles, such as vans and sport utility vehicles (SUVs) lack sufficient space to comfortably transport passengers as well as multiple bulky items such as bicycles. These vehicles may employ a trailer in order to transport excess cargo in a safe, accessible manner without damage to the vehicle. Even where cargo could be accommodated in the passenger compartment of a vehicle, use of a towed trailer serves to free interior space and make trips more comfortable for long distance travelers. Trailers are particularly popular with campers, cyclists and others who occasionally need to transport a load that exceeds the cargo capacity of their vehicle, but do not wish to purchase and maintain a larger vehicle.

While trailers adapted for towing behind passenger vehicles are relatively small and light in comparison with commercial trailers, they are far too large and heavy to be portable by any means other than towing behind a vehicle. In addition, the trailers themselves may present storage problems when they are not in use. These trailers fill certain localized cargo transport needs, such as the hauling of large purchases, yard waste and bicycles. However, because of their size and weight, they are not well suited for remote usage which would require hand carrying for transport by common carrier, such as an airplane, train or bus. Even known trailers with collapsible features far exceed the carrying capacity of a single individual.

Recreational activities such as camping and sports commonly involve convergence of individuals or groups from diverse geographic locations to a common meeting point, followed by vehicular transport of the participants and their equipment to the location of the planned activity. For example, cyclists and their bicycles may arrive by plane for a race or rally and use rental vehicles and trailers for transportation to the actual site of the event. In such cases, it may be necessary to rent a load transporting trailer as well as a towing vehicle. While vehicle rental is commonly available, small trailer rental often is not. Moreover, in most geographic areas, rental of specialized trailers, such as bicycle trailers, is not available.

Accordingly, there is a need for a small trailer which can be disassembled easily into portable, relatively light weight, packable modules of conventional luggage size for hand carrying, for example aboard a commercial aircraft, and quickly reassembled for towing a load behind a vehicle. Such a trailer should be also adaptable for carrying a specialized load, such as bicycles.

SUMMARY OF INVENTION

The present invention provides a load transporting trailer having modular construction with components that are readily separable for quick disassembly into light weight, packable, conventional luggage-sized elements. The trailer includes a pair of lateral frame sections, each including a folding wheel assembly adapted for folding relative to its associated frame section. A central frame section intercouples the lateral frame sections in side-by-side relationship. Alternatively, a pair of rectangular frame sections may be intercoupled with a hinge. A removable deck panel is installed in each frame section and a bike stand may be attached. The trailer includes a tow bar coupled with the frame for connecting the trailer to a towing vehicle. The tow bar folds to form a tripod for supporting the trailer in an upright, parked position. A pair of castered legs is coupled with the aft portion of each frame section to permit rolling of the parked trailer.

Objects and advantages of this invention will become apparent from the following description taken in conjunction with the accompanying drawings wherein are set forth, by way of illustration and example, certain embodiments of this invention.

BRIEF DESCRIPTION OF DRAWINGS

FIG. 4 is a perspective view of an alternate load transporting trailer having a hinged frame.

FIG. 5 is a perspective view similar to that of FIG. 4, showing the frame sections in a partially folded position, and showing one wheel assembly in a folded configuration.

FIG. 6 is a perspective view of the deck panel shown in FIG. 4, illustrated in an inverted orientation.

FIG. 7 is a fragmentary diagrammatic side elevational view of the tow bar, showing a folded position in phantom.

FIG. 8 is an enlarged, transverse, fragmentary section taken along line 8—8 of FIG. 1, showing a suspension arm in its earth traversing position.

FIG. 9 is a view similar to FIG. 8, depicting the suspension arm in a folded position.

FIG. 10 is a fragmentary top plan view of the trailer shown in FIGS. 1 and 4 depicting channels and clamps for attaching bicycles to the trailer.

FIG. 11 is a fragmentary diagrammatic side elevational view of an alternate towing socket suitable for mounting below the inboard side rails of the trailer depicted in FIG. 4.

FIG. 12 is an exploded view of the towbar assembly depicted in FIG. 5.

FIG. 13 is a perspective view of a mounting tube for use on the trailer frames.

The drawings constitute a part of this specification and include exemplary embodiments of the present invention and illustrate various objects and features thereof.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
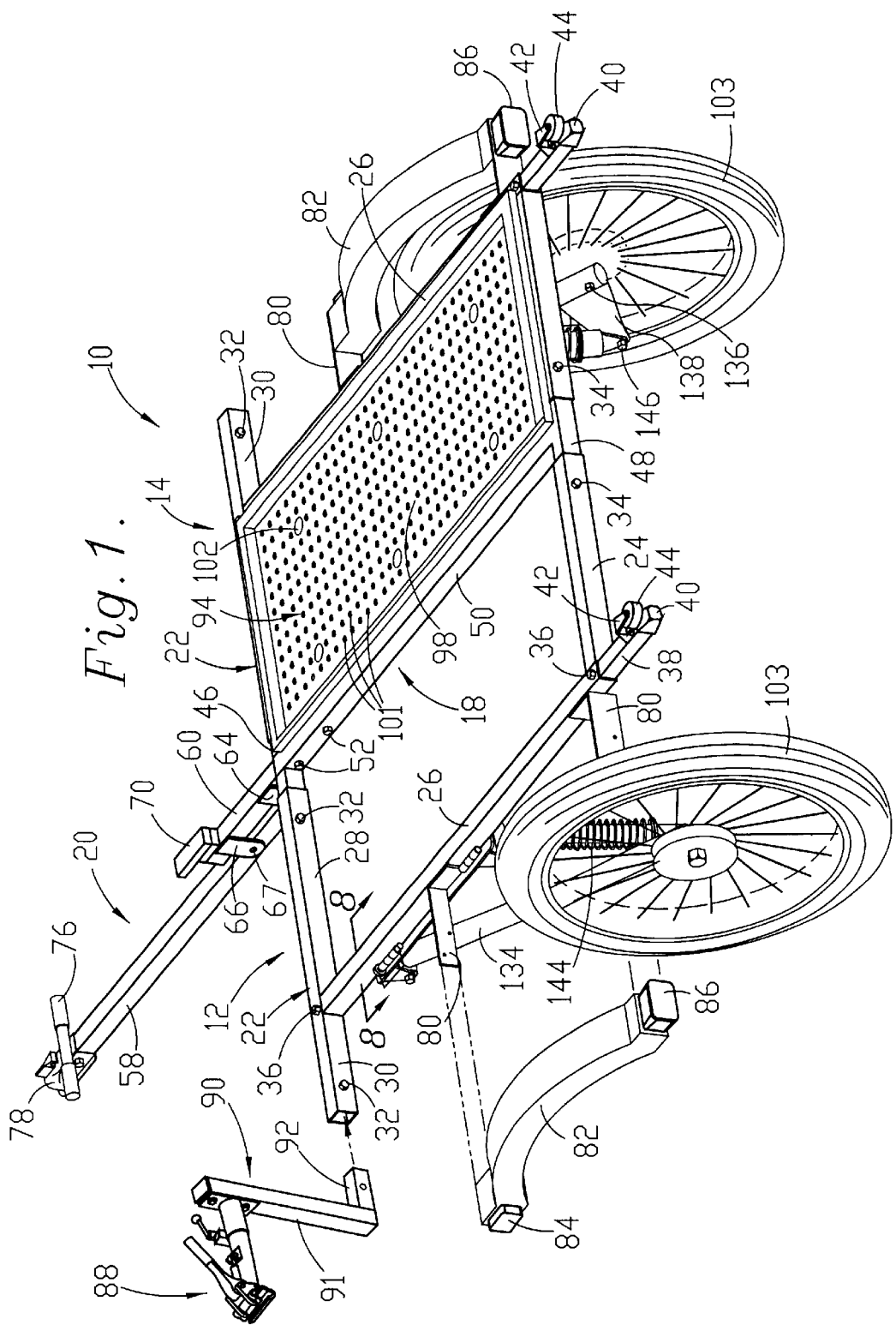
FIG. 1 is a perspective, partially exploded view of a load transporting trailer in accordance with the invention, including an associated bicycle work stand.
Figure 2:
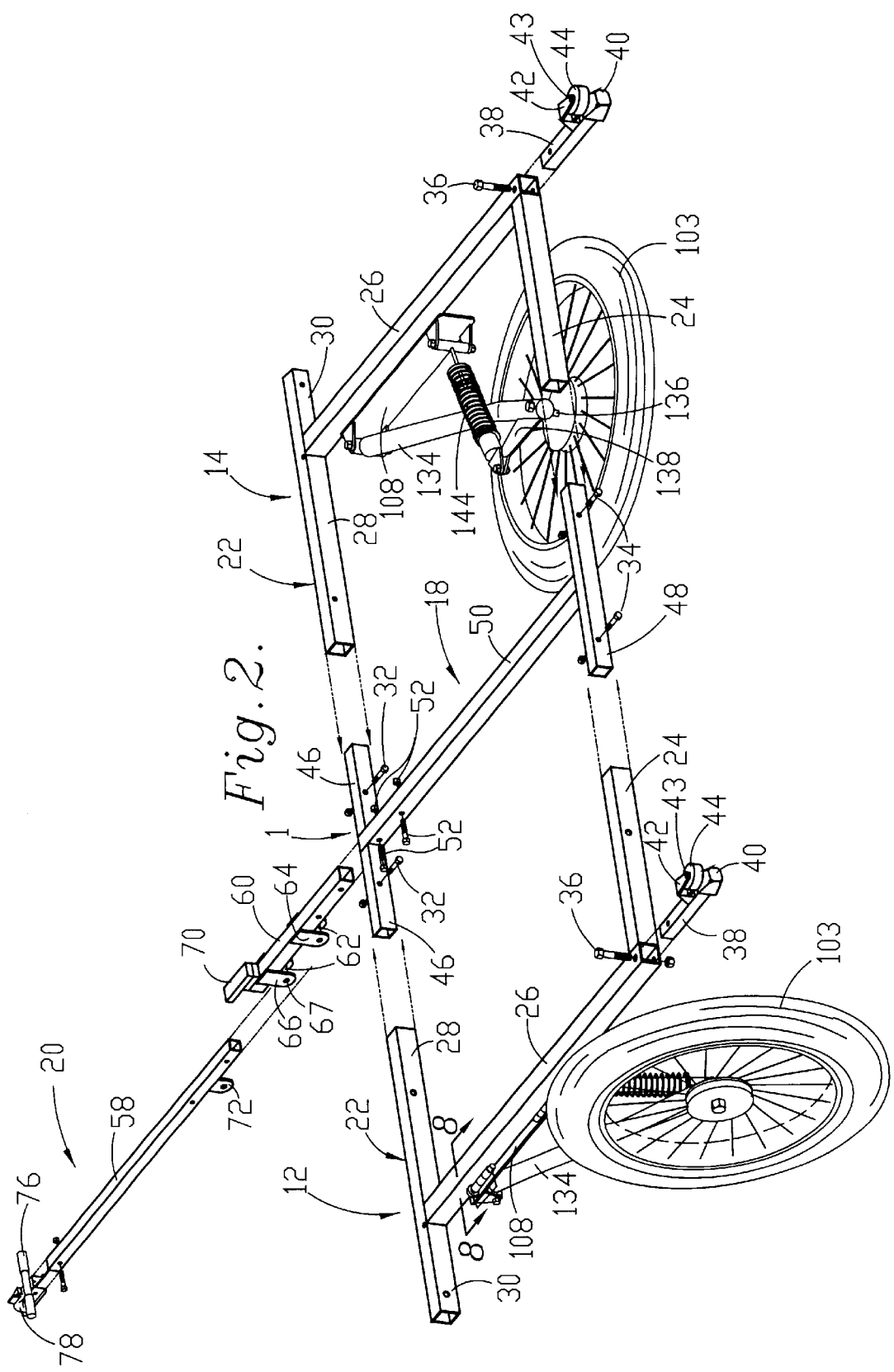
FIG. 2 is an exploded perspective view similar to that of FIG. 1, showing one wheel assembly in a folded configuration.

Referring now to drawing FIGS. 1, 2 and 11, the reference numeral 10 generally designates a modular load transporting trailer in accordance with the present invention. The trailer 10 broadly includes first and second lateral frame sections 12 and 14 surmounting a pair of foldable, wheel suspension assemblies 16 and telescopically intercoupled by a center frame section 18, which is demountably coupled with a towing connection or towbar assembly 20.

In more detail, the lateral frame sections 12 and 14 are mirror images, each including front and rear rails 22 and 24 integrally coupled in parallel, spaced relationship by a side-rail 26. The side-rails 26 thus may be viewed to demarcate an inboard leg 28 and an outboard leg 30 of each front rail 22. The inboard leg 28 and outboard leg 30 are each apertured fore-to-aft for receiving a bolt 32. The rear rails 24 are similarly apertured to receive bolts 34. The ends of each side-rail 26 are apertured top-to-bottom to receive bolts 36. The aft end of each side-rail is integrally coupled with one end of a respective rear rail 24, so that the rear rails 24 extend inboard of the side-rails 26 and toward the center frame section 18. The lateral frame sections 12 and 14 also include a pair of bumper legs 38 which are apertured top-to-bottom for coupling with the aft ends of the side-rails 26. The end of each bumper leg 38 is covered by a rubber or synthetic resin foot 40 for nonskid ground engagement when the trailer 10 is in an upended stowing position, as well as for cushioning against collision. A bracket 42 is mounted on the upper surface of each bumper leg 38 adjacent and slightly inset from its end. The bracket includes a bolt or pin 43 and a roller or wheel 44 is journaled on the pin 43 and is oriented to permit lateral rolling movement of the trailer 10 in an upended position.

The center frame section 18 is generally I-shaped overall, with spaced parallel front and rear rails 46 and 48 integrally intercoupled by a center rail 50. The center rail 50 defines a longitudinal axis which is an axis of symmetry for the trailer 10 as a whole. The front and rear rails 46 and 48 are apertured fore-to-aft to receive the bolts 32 and 34, respectively and the center rail 50 is apertured side-to-side to receive a pair of bolts 52. The forward portion of the center rail 50 includes a dependent flange 54 (FIG. 7), having a central aperture 56.

The towbar assembly 20, depicted in FIGS. 1, 2, and 7, includes front and rear towbars 58 and 60 which are pivotally coupled in partially overlapping relationship by a pin 62 journaled in an apertured strap or yoke 64 which is dependently mounted on the midsection of the rear towbar. A similar yoke 66 having an aperture 67 is dependently mounted on the forward section of the rear towbar for alignment with an aperture 68 in the front towbar 58 and locking in place with a pin (shown at 75). The front end of the rear towbar 60 forms an elevated grab handle 70. The aft portion of the rear towbar 60 is apertured side-to-side to receive the center rail bolts 52 for releasably coupling the towbar assembly 20 with the center frame section 18. The aft portion of the front towbar 58 includes a dependent flange 72 having an aperture 74. The flange 72 is positioned for alignment with the center rail dependent flange 54 when the towbar assembly 20 is in a folded position. The front and rear towbars 58 and 60 are locked in place in the folded orientation by a pin 75 inserted through the aligned apertures 56 and 74. The front towbar also includes a forward handle 76 and a latch 78, for releasably coupling the front end 58 to a hitch mounted on a vehicle (neither is shown).

A pair of L-shaped brackets 80 is coupled with the outboard surface of each side rail 26 for mounting a pair of fenders 82. The brackets 80 are welded to the side rails 26, although they may also be demountably secured by bolts. The brackets 80 are attached to the fenders 82 by nuts and bolts or other suitable fasteners. The fender 82 is constructed of a durable, lightweight synthetic resin material, although a metal, such as aluminum or steel may also be used. A side reflector 84 is shown mounted adjacent the forward portion of the fender 82 and a tail light 86 may be mounted on the aft end.

An optional bicycle work stand 88 is provided for use, for example, to perform emergency bicycle maintenance during a racing event when the trailer 10 is towed by a follow car. The work stand 88 is coupled with a generally L-shaped bracket or mounting arm 90 having an upstanding leg 91 and an inboard leg 92. The inboard leg 92 is apertured front-to-back for receiving a front rail bolt or pin 32 for coupling the bracket 90 with a first or second frame section front rail outboard leg 30.

The frame sections 12, 14 and 18, bumper legs 38 and bicycle stand mounting bracket 90 are preferably constructed of tubular steel or aluminum having a generally square cross-section, although tubing having round or other suitable sectional shapes may be employed in the same or other materials such as metals, synthetic resin compositions, or graphite. The tubing of the lateral frame section front inboard legs 28 and rear rails 24 is sized to receive the center frame section front and rear rails 46 and 48, respectively, in sliding, telescoping relationship. Similarly, the tubing of the center rail 50 is sized for telescoping reception of the rear towbar 60, the lateral frame section side rails 26 are sized for telescoping reception of the bumper legs 38, and the tubing of the lateral frame section outboard legs 30 is sized for reception of the bicycle stand bracket inboard leg 92. The assembled trailer 10 has a generally square overall configuration, although any quadrilateral, A-frame or other shape may be employed.

As shown in FIGS. 1 and 6, a pair of removable deck panels 94 (one is shown) are generally rectangular in shape, each including a perimeter lip 96 surrounding a slightly depressed central portion or bed 98. Each panel 94 is supported by resting the lip 96 on the upper surface of a first or second lateral frame section 12 or 14 and the center frame section 18. Spaced ribs 100 are formed in the lower surface of each central portion 98 to impart strength and rigidity. The upper surface of each bed is stippled with a non-skid material 101 and includes a series of spaced apart drain holes 102.

A pair of mounting tubes 104 are shown in FIGS. 10 and 13, one tube 104 being coupled in parallel relationship with the lateral front rails 22 adjacent the forward end of each side rail 26, and one tube being coupled in orthogonal relationship with the aft end of the side rails 26. Each mounting tube 104 includes a pair of feet 106 which are spaced to correspond with the distance between the side-rail bolts 36, which are employed for detachably securing the mounting tubes 104 with the side-rails 26. The mounting tubes are coplanar and define a load carrying framework which exceeds the dimensions of the assembled trailer 10.

U.S. Pat. No. 6,164,863 issued to Kalman and incorporated herein by reference, discloses a high performance suspension system 16 of the type used in the present invention to independently suspend a wheel 103 from each lateral frame section 12 and 14. As shown in FIGS. 1–3 and 8–10, a portion of the lower surface of each lateral side rail 26 generally forward of the wheel 103 is coupled with a generally rectangular suspension plate 108 by a pair of inboard hinges 110. The suspension plate 108 may be pivoted about the hinges 110 from a wheel suspending position (FIGS. 3 and 8) surmounted by the side rail 26, to a wheel folding or stowing position (FIG. 9) inboard of the side rail 26.

Each suspension plate 108 is held in place by a pair of hinge-type stationary and movable forward latching sleeves 112 and 114 and an aft locking sleeve 116 and associated pair of eyelets 120 (FIG. 10). A stationary latching sleeve 112 is coupled with the outboard side of each lateral side rail 26 adjacent the forward portion of a respective suspension plate 108 and a movable latching sleeve 114 is coupled with the suspension plate 108 for coaxial alignment when the sleeves 112 and 114 are adjacent in the wheel suspending position. The aligned sleeves 112 and 114 are secured by pins 116. Similarly, a locking sleeve 118 is coupled with the outboard side of each lateral side rail 26 adjacent the aft portion of a respective suspension plate 108 and a pair of movable eyelets 120 are coupled with the plate 108 for coaxial alignment. Quick-release locking bolts 122 are inserted through the aligned locking sleeve and eyelets for releasably locking the suspension plates 108 in the wheel suspending position.

The forward portion of each suspension plate 108 is coupled with a pair of spaced, dependent mounting brackets 126 with a bolt 128 therebetween. A bushing 130 is sleeved on the bolt 128, which is held in place by a nut 132. A conventional hex nut 132 is depicted, but any one of a variety of locking nuts may also be employed. The bushing 130 is integrally coupled with one end of a wheel suspension arm 134 by welding. This construction provides for pivotal movement of each wheel suspension arm 134 about a corresponding bolt 128 so that each arm 134 is free to move elevationally with respect to its associated lateral side rail 26.

The suspension arms 134 are constructed of metal tubing, such as steel, aluminum, or the like and have a curvate profile for offsetting the wheels 103 slightly from the trailer frame sections 12 and 14. A trailer wheel 103 mounted on an axle 136 is rotatably coupled with the rear portion of each suspension arm 134. Each suspension arm 134 includes a dependent suspension bracket 138 (FIG. 2) positioned slightly forward of the associated axle 136.

The aft portion of each suspension plate 108 is coupled with a pair of spaced, dependent mounting brackets 140, with a bolt or pin 142 therebetween. A heavy-duty spring/damper shock absorber 144 is coupled at its lowermost end with the suspension brackets 138 and held in place by a corresponding bolt or pin 146. The uppermost end of the shock absorber 144 is coupled with the aft mounting brackets 140 and held in place by a bolt or pin 142.

Figure 3:
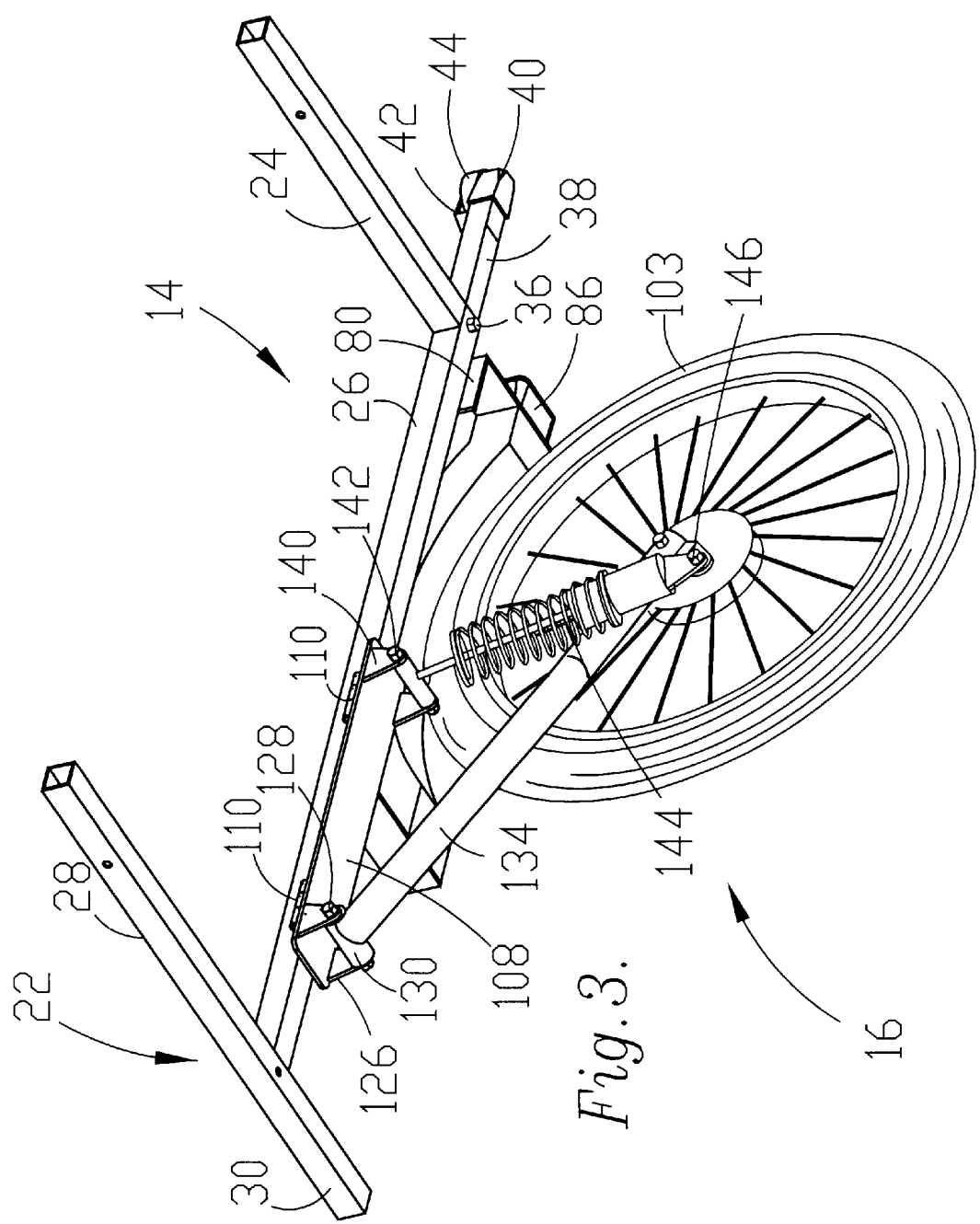
FIG. 3 is a fragmentary perspective view of the folding wheel assembly of FIG. 1 viewed from below.

In this manner, the coupling arrangement of the suspension arms 134 and plates 108 with the wheels 103 and shock absorbers 144 cooperatively permits pivotal movement of the wheels 103 and shock absorbers 144 relative to the lateral side rails 26. The wheels can thus be moved between vertical, earth-traversing positions generally parallel to and coaxial with each other and disposed outwardly of their respective lateral side rails 26, as shown in FIGS. 1, 3 and 10, and folded or stowing positions generally coplanar with each other and disposed under and generally parallel to the frame sections 12, 14 and 18, as shown in FIG. 2.

As best shown in FIG. 10, the trailer 10 includes lateral, central and intermediate, upwardly open bicycle supporting channels or rails 148, 150 and 152, which are secured by releasable fasteners 154 to the mounting tubes 104 in a generally transverse relationship. The lateral and central channels 148 and 150 are somewhat longer than the intermediate channels 152 in order to accommodate bicycles having a variety of lengths. Bicycle frame clamps 156 attached to the rear channel fasteners 154 and bicycle fork clamps 158 are attached to the rear mounting tube 104 for use in association with the various channels 148, 150 and 152. The channel fasteners 154, frame clamps 156 and fork clamps 158 are of conventional construction and any of a number of suitable fastener types may be employed. Those skilled in the art will appreciate that, while five bicycle supporting channels 148, 150 and 152 have been described and shown, the number of channels may be augmented by employing a longer mounting tubes 104. Similarly, the number of channels may be reduced. Any such augmentation or reduction should be symmetrical, in order to balance the load for towing stability. Further details of the bicycle supporting channels 148, 150 and 152 can be found in U.S. Pat. No. 6,164,683.

In use, the load transporting trailer 10 is extremely convenient to assemble and disassemble into modules for packing in any suitable container, such as a crate, trunk or suitcase, so that it may be stored or transported to a remote location. Because of the relatively small and manageable size of the frame sections 12 and 14 and 18, it is not necessary to dismantle the wheel assemblies 16 for packing, although the wheels 103 may be easily removed for convenience. The packable modules include lateral frame sections 12 and 14, each having an associated folded wheel assembly 16 (FIG. 1), fenders 82, a center frame section 18, folded towbar assembly 20, deck panels 94 and/or mounting tubes 104 and bicycle channels 148, 150 and 152 or other mounting hardware. Each module has a generally planar orientation or can be folded by a user into a near approximation thereof, and this enables it to be stacked adjacent the other modules along with associated fasteners in order to maximize use of the packing space. Because the entire assembly is relatively light weight, not exceeding 150 pounds, it can be fitted into a pair of appropriately sized "suitcase" type carriers and hand carried for transport as airplane baggage without exceeding airline industry baggage size and weight requirements.

Upon arrival at a preselected destination, a user can quickly assemble the modules into a trailer 10. The user first aligns the inboard legs 28 and rear rails 24 of the lateral frame sections 12 and 14 with the front and rear rails 46 and 48 of the center frame section 18. By urging the respective legs and rails toward each other, the center front and rear rails 46 and 48 are received within the respective lateral inboard legs 28 and rear rails 24 in telescopic engagement and the frame sections 12, 14 and 18 are secured with bolts or pins 32 and 34.

The user then grasps a wheel suspension arm 134 and uses it to rotate the wheel suspension plate 108 about the inboard hinges 110 until the movable latching sleeves 114 align with the fixed latching sleeves 112 and the locking sleeves 118 align with the eyelets 120. The suspension plates are locked in place with the corresponding wheels in an upright, ground engaging position using the pins 116 and locking bolts 122. The fenders 82 are installed by slipping them over the outstanding portions of the brackets 80 and fastening them with bolts or pins (not shown).

The user next grasps the front towbar 58, removes the pin 75 and rotates the towbar 58 forward from its folded position adjacent the rear towbar 60 and into a parallel position in which the aperture 68 is aligned with the rear towbar yoke 66. The pin 75 is slipped into the aligned apertures 67 and 68 to lock the towbar 20 in place in its extended orientation. The user next inserts the free end of the rear towbar 60 into the center frame section 18 in telescoping relationship, where it is secured by bolts 52.

Optional deck panels 94 may be dropped into place in the openings between the respective lateral frame sections 12 and 14 and the center frame section 18. Alternatively or in addition, a user may position the mounting tubes 104 so that the feet 106 are aligned with corresponding apertures in the lateral front and rear rails 22 and 24, where they are secured by bolts 36. The bicycle channels 148, 150 and 152 are fastened to the mounting tubes 104 using the channel fasteners 154. After one or more bicycles (not shown) are positioned in the respective channel 148, 150 or 152, they are secured to the trailer 10 by the appropriate frame and fork clamps 156 or 158. Those skilled in the art will appreciate that other mounting hardware may be used to secure boats, boxes or any other specialty equipment (not shown).

The bicycle stand 88 is installed in similar fashion, by aligning the mounting arm inboard leg 92 with the front rail outboard leg 30 and urging the two together so that the mounting arm leg 92 slidingly receives the rail outboard leg 30 in telescoping relationship and the two are secured by a bolt 32.

The user employs the handle 76 to position the trailer 10 adjacent the rear of a towing vehicle (not shown) and couples the towbar latch 78 to a vehicle trailer hitch (not shown). Thus loaded, the trailer 10 may be towed to a predetermined location.

Following use, the trailer 10 is unloaded and may be disassembled for storage by reversal of the preceding operations. Alternatively, the trailer may be upended on the bumper legs 38, the pins 116 and locking bolts 122 removed and the wheels 103 folded inboard, toward the center rail 50. The pin 75 is removed and the front towbar 58 pivoted about pin 62 to its folded position adjacent the center rail 50 and the pin 75 reinserted into the aligned apertures 56 and 74, to lock the towbar assembly 20 into its folded position. A user can roll the upended trailer 10 sideways on its wheels 44 by leaning the upended trailer slightly forwardly, causing ground engagement of the wheels 44 and corresponding disengagement of the legs 38. The trailer 10 is then rolled to a desired storage location and leaned slightly backwardly, causing ground engagement of the legs 38 and disengagement of the wheels 44. In this manner, the trailer legs 38 and towbar assembly 20 form a tripod for supporting the trailer 10 in an upended position, for example, adjacent a wall where it will not intrude into a storage area.

FIGS. 4, 5, 11 and 12 depict a first alternate embodiment of a modular load transporting trailer. The structure of this embodiment is substantially similar to that previously described, except that the frame is constructed in two sections rather than three, and the entire apparatus may be folded into a footprint the size of one frame section.

The modular hinged trailer 210 includes a roadside first frame section 212 hingedly coupled in side-by-side relationship with a curbside second frame section 214, each surmounting a foldable, wheel suspension assembly 216 and jointly coupled with a towing connection or towbar assembly 218.

In more detail, the frame sections 212 and 214 are mirror images, each including front and rear rails, 220 and 222 orthogonally coupled with an outboard side rail 224 and an inboard side rail 226. Because the front rails 220 are somewhat longer than the rear rails 222, a portion of the front rail 220 extends laterally beyond each respective side rail 224 to form an outboard leg 228. The inboard side rails 226 are intercoupled by a plurality of spaced hinges 230, a portion of each being integrally coupled with a respective inboard side rail 226, for example, by welding. The inboard side rails define a longitudinal axis which is an axis of symmetry for the trailer 210 as a whole. The rear rails 222 are intercoupled by a plate 232, which overlies the inboard margins of the rails 222 and is held in place by a pair of bolts or pins 234. The aft end of each outboard side rail 224 is coupled with a pair of bumper legs 236 by a bolt or pin 238. A yoke-shaped bracket 240 is mounted on the upper surface of each bumper leg 236 adjacent and slightly inset from its end. The bracket 240 supports a bolt or pin 242 in a vertical orientation. A wheel 244 is journaled on the pin 242 for lateral rolling movement.

FIGS. 4, 5 and 12 depict a towbar assembly 218 having a towbar 246 and a towbar socket 248. The socket 248 is integrally coupled with a towbar mounting bracket 250, which is apertured to receive a series of bolts 252. The towbar 246 and the socket 248 are correspondingly apertured to receive a pair of bolts or pins 254. The towbar 246 includes a forward handle 256 and terminates in a latch 258, for releasably coupling with a vehicle hitch (not shown). FIG. 11 depicts an alternate towbar socket 260 which is dependently coupled with the inboard side rails 226 by a pair of brackets or straps 262. The towbar 246 is received within the socket 260 as previously described. Those skilled in the art will appreciate that the folding towbar assembly 20 previously described may be substituted for the towbar 246.

A pair of generally L-shaped brackets 264 is coupled with the aft outboard aspect of each outboard side rail 224 for mounting a fender 266. The elements and construction of the fender 266 are similar to that previously described for the fender 82.

An optional bicycle stand and mounting arm (not shown) similar to the stand 88 depicted in FIG. 1 may be telescopingly coupled with one of the front rail outboard legs 228.

The frame sections 212 and 214 are constructed of materials as previously described except that the front and rear rails 220 and 222 and the side rails 224 and 226 of each section are integrally coupled, for example by welding. Where graphite or synthetic resin materials are used, they may be of unitary construction. The tubing of the bumper legs 236 is sized for telescoping reception by the terminal ends of the outboard side rails 224. While three hinges 230 are depicted in FIGS. 4 and 5 coupling the frame sections 212 and 214 together along the longitudinal axis, it is foreseen that any number of bolts, quick release coupling devices or other suitable fasteners may also be employed.

A pair of removable deck panels 268 (one is shown) are sized for reception on each frame section 212 and 214. The deck panels 268 are substantially similar to the panels 94 previously described and depicted in FIG. 6.

A pair of mounting tubes 270 is provided. One mounting tube 270 is coupled in parallel relationship with the front rails 220 at spaced points adjacent the forward end of each outboard side rail 224. The other is coupled in orthogonal relationship with the aft portions of the side rails 224.

A pair of wheel suspension assemblies 216 are depicted in FIGS. 3, 4 and 5 and are substantially similar to the wheel suspension assemblies 16 previously described. The wheel assemblies each include a wheel 272 coupled with a hinged suspension plate 274 by a wheel suspension arm 276 and a shock absorber 278. This coupling arrangement permits pivotal movement of the wheels 272 and shock absorbers 278 relative to the outboard side rails 224 as previously described. The wheels 272 may be shifted from a generally vertical, ground-engaging position (FIG. 4) in which they are generally parallel to and coaxial with each other and disposed outboard of their respective outboard side rails 224, to a stowing position (FIG. 5) in which they are generally coplanar with each other and disposed under and generally parallel to the frame sections 212 and 214.

The trailer may also include bicycle supporting channels or rails as previously described and shown in FIG. 10 to include a plurality of channel rails 148, 150 and 152 and associated fasteners 154 and bicycle frame and fork clamps 156 and 158. Those skilled in the art will appreciate that other mounting hardware may be used to secure boats, boxes or any other specialty equipment (not shown).

In use, the hinged modular trailer 210 is light weight easy to assemble and disassemble, and may be disassembled into modules including the first and second frame sections 212 and 214, each including a folded wheel 244 (FIG. 5), fenders 266, a towbar assembly 218, deck panels 268 and/or mounting tubes 270 and bicycle channels 148, 150 and 152 or any other mounting hardware. With the wheels 272 in their folded position, each module can be folded nearly flat and the entire assembly 210 can be packed into a pair of suitcases.

The modules are easily assembled by a user into a trailer 210 by aligning the frame sections 212 and 214 for mating engagement of the respective hinge portions 230 and insertion of pins (not shown). The user fastens the plate 232 to the rear rails 222 with a pair of pins 234. The user then grasps a wheel suspension arm 276, uses it to rotate the wheel 272 into a ground engaging position and inserts pins and locking bolts as previously described. The fenders are installed by slipping them over the flanges 264 and fastening with bolts (not shown).

The towbar socket 248 is coupled with the front rails 220 by fastening the mounting bracket 250 to the rails 220 using the bolts 246. A user aligns the towbar 246 with the socket 248 for sliding telescopic engagement and inserts the pins 254 to hold the towbar 246 in place. The alternate socket assembly 260 may be installed by sliding the straps 262 over the outboard surfaces of the adjacent inboard side rails 226 and fastening them in place using pins or bolts (not shown). The towbar 246 is then installed as previously described.

The optional deck panels 268 may be dropped into place over the rails of the frame sections 212 and 214. The user positions the mounting tubes 270 in spaced parallel relationship with the respective front and rear rails and attaches them with fasteners (not shown). The bicycle channels 148, 150 and 152 are fastened to the mounting tubes 104 using the channel fasteners 154. Bicycles are positioned in the respective channels and secured to the trailer 210 by frame and fork clamps 156 and 158.

The user grasps the handle 256 to position the trailer 210 adjacent the rear of a towing vehicle (not shown) and couples the towbar latch 258 to a hitch for towing the load to a predetermined location.

Following use, the trailer 210 is unloaded and may be disassembled by lifting out the deck panels 268 and unbolting the towbar socket 248 for removal of the socket 248 and its associated towbar 246. The trailer 210 may be upended on the bumper legs 236 and, if a folding towbar is employed, shifting the towbar to its folded position. The suspension plates 274 are next unpinned for folding the wheels 272 inboard, toward the inboard side rails 226. The user can then lean the upended trailer 210 slightly forwardly to engage the wheels 244 for rolling the trailer 210 in a sideways direction.

Alternatively, the user may unbolt the plate 232, fenders 266, mounting tubes 270 and their associated bicycle channels 148, 150 and 152 prior to upending the trailer 210, in order to permit unobstructed rotation of the frame sections 212 and 214 about their longitudinal hinges 230 and into a folded position in which the upper surfaces of the rails 220, 222, 224 and 226 are adjacent. By unpinning the suspension plates 274 and folding the wheels 272 inboard, toward the inboard side rails 226, the trailer 210 may be folded into an extremely compact, overall rectangular configuration having a very small footprint and requiring a minimum of storage space.

It is to be understood that while certain forms of the present invention have been illustrated and described herein, it is not to be limited to the specific forms or arrangement of parts described and shown.

Having thus described the invention, the following is claimed as new and desired to be secured by Letters Patent:

1. Modular trailer apparatus, comprising:
   a first lateral frame section;
   a second lateral frame section;
   said first and second lateral frame sections releasably coupled in side-by-side relationship in such a manner as to enable modular disassembly and re-assembly;
   each said frame section having a folding wheel assembly connected thereto, said folding wheel assembly being adapted to fold relative to its associated frame section;
   a towing connection assembly releasably coupled with said frame sections and enabling connection of said frame sections to a towing vehicle and
   a center frame section intercoupling said first and second lateral frame sections in telescoping relationship.

2. The trailer apparatus as set forth in claim 1, further including:
   a bicycle mounting assembly attached to at least one of said first and second lateral frame sections.

3. The trailer apparatus as set forth in claim 2, wherein;
   each of said lateral frame sections includes an inboard side and an outboard side; and
   said outboard sides include means for coupling a bicycle workstand with said lateral frame sections.

4. The trailer apparatus as set forth in claim 1, wherein:
   said towing connection assembly includes a first towing connection section and a second towing connection section;
   said first and second towing connection sections being pivotally coupled for permitting folding of said first section toward said frame sections.

5. The trailer apparatus as set forth in claim 1, further including:
   a generally planar deck panel removably coupled with each of said first and second lateral frame sections for forming a load supporting deck surface.

6. The trailer apparatus as set forth in claim 1, wherein:
   each frame section with an associated folding wheel assembly has a weight commensurate with manual lifting and carrying.

7. A modular trailer, comprising:
   first and second lateral frame sections;
   said first and second lateral frame sections releasably coupled in side-by-side relationship in such a manner as to enable modular disassembly and reassembly;

each of said lateral frame sections having a folding wheel assembly connected thereto, said folding wheel assembly being adapted to fold relative to its associated frame section;

a center frame section telescopically intercoupling said first and second lateral frame sections in side-by-side relationship; and a towing connection assembly releasably coupled with said frame sections and enabling connection of said frame sections to a towing vehicle.

8. The trailer apparatus as set forth in claim 7, further including:

a bicycle mounting assembly attached to at least one of said first and second lateral frame sections.

9. The trailer apparatus as set forth in claim 8, wherein;

each of said lateral frame sections includes an inboard side and an outboard side; and said outboard sides include means for coupling a bicycle workstand with said lateral frame sections.

10. The trailer apparatus as set forth in claim 7, wherein:

said towing connection assembly includes a first towing connection section and a second towing connection section;

said first and second towing connection sections being pivotally coupled for permitting folding of said first section toward said frame sections.

11. The trailer apparatus as set forth in claim 7, further including:

a generally planar deck panel removably coupled with each of said first and second lateral frame sections for forming a load supporting deck surface.

12. A modular trailer, comprising:

first and second lateral frame sections, each having a front rail, a side rail and a rear rail;

each of said first and second frame sections having a stowable wheel assembly connected thereto, said stowable wheel assembly being adapted to move relative to its associated frame section to place an associated wheel in a stowed position relative to the associated frame section;

each of said first and second frame sections with said stowable wheel assembly connected thereto constituting a respective first or second module;

said first and second modules releasably coupled in side-by-side relationship in such a manner as to enable modular disassembly and reassembly;

a center frame section telescopically intercoupling said first and second modules in side-by-side relationship; and a towing connection assembly releasably coupled with said modules and enabling connection of said modules to a towing vehicle.

* * * * *